Oct. 14, 1930.  J. C. CANNON  1,778,354
GATE OPERATING MECHANISM
Filed March 6, 1929   3 Sheets-Sheet 1
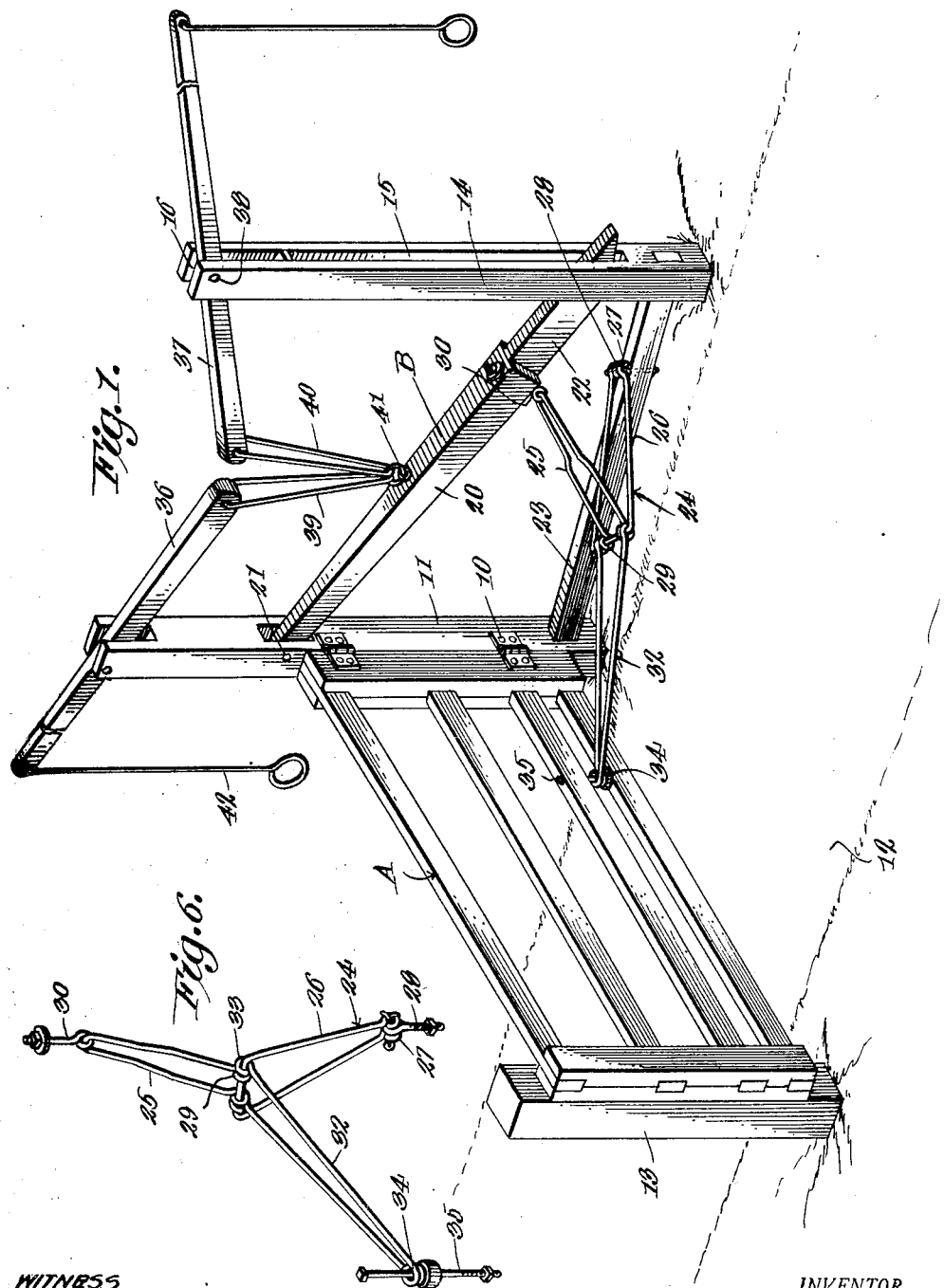
INVENTOR.
JAMES C. CANNON

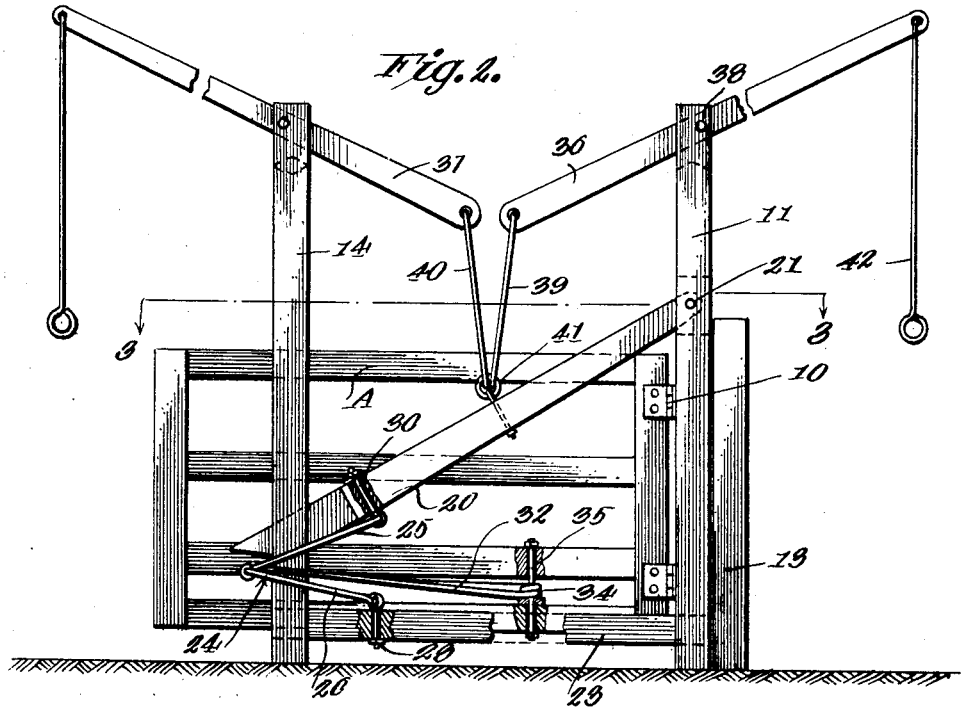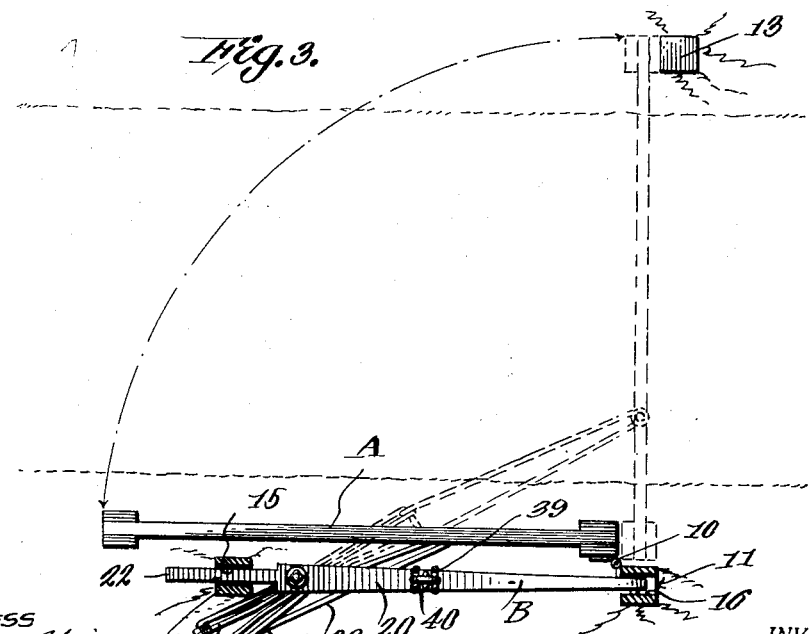

Oct. 14, 1930.   J. C. CANNON   1,778,354
GATE OPERATING MECHANISM
Filed March 6, 1929   3 Sheets-Sheet 3
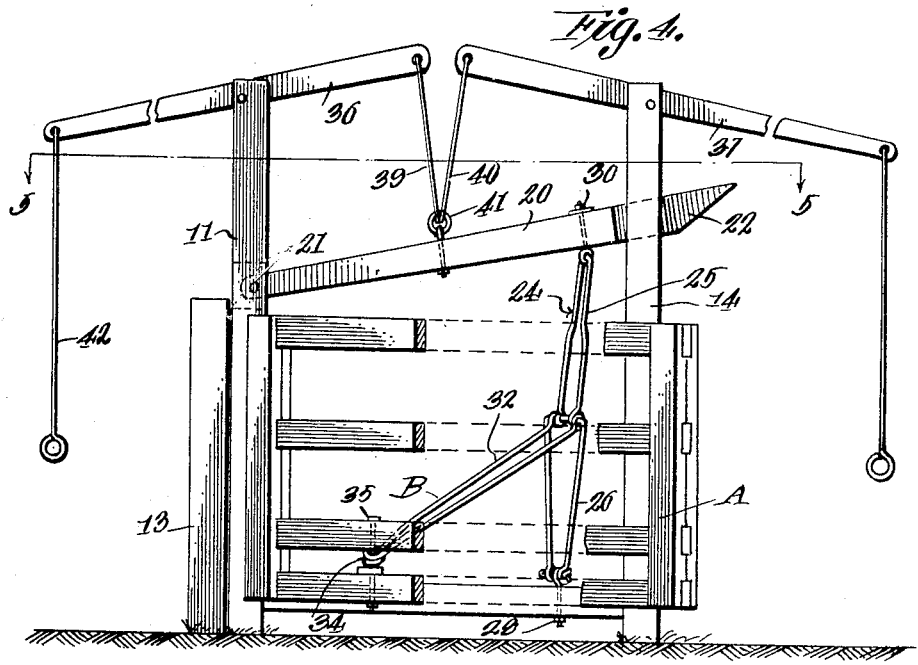
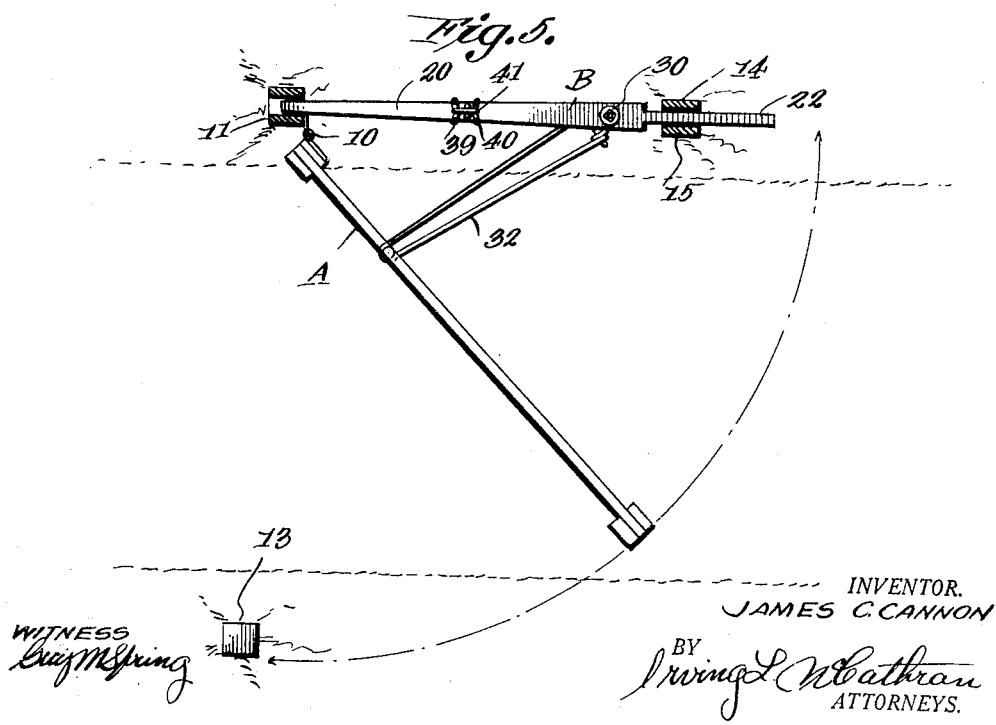
INVENTOR.
JAMES C. CANNON Patented Oct. 14, 1930

1,778,354

UNITED STATES PATENT OFFICE

JAMES C. CANNON, OF HIWASSE, ARKANSAS

GATE-OPERATING MECHANISM

Application filed March 6, 1929. Serial No. 344,749.

This invention appertains to road gates and has for one of its primary objects means arranged at a point distant therefrom and on opposite sides thereof for opening and closing the gate whereby persons in vehicles can conveniently actuate the gate without alighting.

Another salient object of the invention is the provision of a novel operating means for a road gate which is so constructed as to hold the gate, normally either in a closed or an opened position against swinging movement thereby eliminating the necessity of providing a latch or fastener for the gate.

A further object of the invention is the provision of a novel weighted bar movable toward and away from a stationary bar, the bars, having a toggle connection therebetween with a drag link connected to the gate and to the toggle at the point of connection of the toggle links with means for raising and lowering the swinging bar at a point distant from the gate, whereby upon raising of the bar the gate will be moved either to a closed or open position as the case may be according to the initial position of the gate.

A further object of the invention is the provision of novel means for arranging the toggle between the swinging beam or bar and the stationary bar relative to the drag link of the gate so that the gate will be held either in its open or closed position by said toggle against accidental swinging movement, the swinging bar or beam acting as a weight to hold the toggle in either one of its two positions and to facilitate the swinging of the toggle over its dead center during the opening or closing of the gate.

A still further object of the invention is to provide an improved gate operating mechanism of the above character, which will be durable and efficient in use, one which will be simple and easy to manufacture, and one which can be placed upon the market at a reasonable cost.

With these and other objects in view, the invention consists in the novel construction and arrangement of parts, as will be hereinafter more specifically described, claimed, and illustrated in the accompanying drawings, in which drawings:—

Figure 1 is a perspective view of the gate and the operating mechanism therefor.

Figure 2 is a side elevation of the gate showing the same in its open position, parts thereof being broken away and in section.

Figure 3 is a horizontal section taken on the line 3—3 of Figure 2 looking in the direction of the arrows.

Figure 4 is a view similar to Figure 2 showing the gate being moved to its closed position.

Figure 5 is a horizontal section taken on the line 5—5 of Figure 4 looking in the direction of the arrows, and Figure 6 is a detail perspective view of the toggle and the drag link for the gate.

Referring to the drawings in detail, wherein similar reference characters designate corresponding parts throughout the several views, the letter A generally indicates a gate and B the novel operating mechanism therefor.

The gate A can be of any preferred or conventional construction and is connected at its inner end by means of hinges 10 to a gate post 11 positioned at one side of a roadway 12. The free end of the gate A is adapted to close against a post 13 arranged on the opposite side of the roadway 12 from the post 11. It is to be noted that the post 11 extends an appreciable distance above the gate and the post 13.

Spaced from the gate and on the same side of the roadway as the post 11 is a post 14 which is provided with a slotted guideway 15. The posts 11 and 14 are of substantially the same height and each have their upper end bifurcated as at 16 for a purpose, which will be later described.

The operating means B for the gate A comprises a novel swinging beam 20 which is connected at its inner end to the post 11 by means of a pivot pin 21 directly above the gate A. The outer end of the lever is preferably thickened to form a weight and the extreme outer end thereof is provided with a reduced extension or guide shoe 22 which is slidably mounted within the guideway 15 of the post 14.

This swinging beam is arranged above a stationary bottom beam or bar 23 which rigidly connects the lower ends of the posts 11 and 14 together.

In accordance with my invention I connect the swinging bar or beam 20 with the stationary bar or beam 23 by means of a toggle 24 which includes upper and lower links 25 and 26 respectively, which are of substantially the same length. The links 25 and 26 of the toggle 24 can be formed in any desired way, but I prefer to construct the lower link 26 out of a suitable metal bar of the desired gage and bend the same in substantially U-shaped form with the legs thereof converging toward their outer ends. The outer ends of the legs are provided with eyes 27 which register with the eye of an eye bolt 28 carried by the stationary bar or beam adjacent to the post 14. The upper link 25 is also preferably formed from a metal bar of the desired gage of a substantially U-shape with the terminals of its legs formed with eyes 29 receiving the bight portion of the link 26. The outer end of the link 25 receives the eye of an eye bolt 30 carried by the swinging beam or bar 20.

A drag link connection is provided between the toggle 24 and the gate A and this drag link is indicated by the reference character 32 and is also preferably formed from a metal bar of desired gage of a substantially V-shape. The legs of the bar are provided with eyes and are coiled about the bight portion of the link 26 of the toggle 24. The bight portion of the drag link 32 is coiled to provide an eye 34 which receives a vertically disposed pivot bolt 35 carried by the gate. The eye 34 is of greater diameter than the bolt so that the same can have a slight rocking movement thereon in a vertical plane as well as a swinging movement in a horizontal plane. If it is desired the eye bolts 28 and 30 can also have a slight play in the bars 20 and 23.

In order to operate the gate from a point distant on opposite sides thereof the bifurcated ends 16 of the posts 11 and 14 receive operating levers 36 and 37 and these levers are rockably mounted at a point intermediate their ends on suitable pivot pins 38 carried by the said posts. The inner ends of the levers are preferably heavier than the outer ends so that the same will normally swing toward the swinging beam 20 by gravity. The same are connected to the swinging beam 20 by links 39 and 40, the links being pivotally connected to the inner ends of the operating levers 36 and 37 and to a common ring 41 carried by the swinging beam intermediate the ends thereof.

The outer ends of the operating levers are provided with pull handles 42.

In operation of the improved gate, when the gate is in its closed position and when a pull is exerted on either one of the hand pulls 42 the swinging beam or bar 20 will be raised causing the toggle 24 to straighten out and consequently exerting a pull on the drive link 32 moving the gate toward an open position. A sufficient pull is given the handles so as to swing the toggle 24 past its dead center and the weighted beam 20 will then swing downward upon the release of the handle and the toggle will swing on the opposite side of the posts 11 and 14 still continuing a pull on the gate A moving the same to a complete open position.

When it is desired to close the gate a quick pull is given either one of the handles 42 and the beam 20 will again be swung to a raised position on its pivot straightening out the toggle 24 consequently pushing on the link 32 and moving the gate toward its closed position.

As the toggle swings past its dead center the weight of the beam 20 will continue to push the gate to its closed position.

When the gate is in its closed position as shown in Figure 1 of the drawing it can be seen that the same is maintained in that position against accidental swinging movement due to the fact that the pivot 34, 27, and 29 will all be in the same horizontal plane which will prevent the breaking of the toggle.

When the gate is in its open position as shown in Figure 2 of the drawing, the same will be maintained in that position against accidental swinging movement due to the fact that any pull on the drag link 32 will operate straight against the pivot 30 and the bar 20 or beam will hold the gate open.

From the foregoing description, it can be seen that I have provided a novel gate mechanism which will function to quickly and easily open the gate at a point distant therefrom and which hold the gate either in an open or closed position against accidental swinging movement.

Changes in details may be made without departing from the spirit or the scope of this invention, but:—

What I claim as new is:

The combination with a gate, a gate post and means connecting the gate to the post for swinging movement, of an operating mechanism for the gate including a post provided with a vertically extending guide slot, said post being arranged along side of the roadway at one side of the gate, a stationary beam connecting the gate post and second mentioned post together below the slot, a movable beam tapered toward one end extending from the gate post to the second mentioned post, means pivotally connecting the tapered end of the movable beam to the gate post adjacent to the upper edge of said gate, a narrow guide arm extension formed on the thickest end of the movable beam received in said vertical guide slot of the second mentioned post, a toggle, means connecting one end of the toggle to the movable beam at the thickest portion thereof, means connecting the other end of the toggle to the stationary beam, a link operatively connecting the toggle to the gate, operating levers carried by the upper end of the posts, means operatively connecting the inner ends of the levers to the movable beam intermediate its ends, and hand pulls on the outer ends of said levers.

In testimony whereof I affix my signature.

JAMES C. CANNON.